(12) United States Patent
Nelke et al.

(10) Patent No.: US 9,996,558 B2
(45) Date of Patent: Jun. 12, 2018

(54) METHOD AND SYSTEM FOR ACCESSING A SET OF DATA TABLES IN A SOURCE DATABASE

(71) Applicant: International Business Machines Corporation, Armonk, NY (US)

(72) Inventors: Sebastian Nelke, Frickenhausen (DE); Martin Oberhofer, Bondorf (DE); Yannick Saillet, Stuttgart (DE); Jens Seifert, Gaertringen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 496 days.

(21) Appl. No.: 14/475,670

(22) Filed: Sep. 3, 2014

(65) Prior Publication Data

US 2015/0066987 A1 Mar. 5, 2015

(30) Foreign Application Priority Data

Sep. 3, 2013 (GB) .................................. 1315611.2

(51) Int. Cl.
*G06F 17/30* (2006.01)
(52) U.S. Cl.
CPC .............................. *G06F 17/30289* (2013.01)
(58) Field of Classification Search
CPC .............................................. G06F 17/30289
See application file for complete search history.

(56) References Cited

U.S. PATENT DOCUMENTS

| 6,804,627 | B1 * | 10/2004 | Marokhovsky ..... G06F 11/3409 702/182 |
| 6,836,777 | B2 * | 12/2004 | Holle ..................... G06Q 30/02 |
| 8,527,543 | B1 * | 9/2013 | Weil .................. G06F 17/30306 707/791 |
| 2009/0193041 | A1 * | 7/2009 | Hornibrook ...... G06F 17/30595 |
| 2010/0030817 | A1 | 2/2010 | Heping et al. |
| 2011/0060726 | A1 | 3/2011 | Idicula et al. |
| 2012/0102053 | A1 | 4/2012 | Barrett et al. |

FOREIGN PATENT DOCUMENTS

| CN | 1434406 A | 8/2003 |
| CN | 101277272 A | 10/2008 |
| CN | 101615193 A | 12/2009 |

* cited by examiner

*Primary Examiner* — Kristopher Andersen
(74) *Attorney, Agent, or Firm* — Cantor Colburn LLP

(57) ABSTRACT

Embodiments relate to accessing a set of data tables in a source database. A set of table categories is provided for tables in the source database and a set of metrics is provided. For each table of the set of the data tables: the set of metrics is evaluated, the evaluated set of metrics is analyzed, and the table is categorized into one of the set of table categories using the result of the analysis. Information indicative of the table category of each table of the set of tables is output, and in response, a request to select data tables of the set of data tables is received according to a part of the table categories for data processing. A subset of data tables of the set of data tables is selected using the table categories for performing the data processing on the subset of data tables.

14 Claims, 4 Drawing Sheets

METHOD AND SYSTEM FOR ACCESSING A SET OF DATA TABLES IN A SOURCE DATABASE

FOREIGN PRIORITY

This application claims priority to United Kingdom Patent Application No. 1315611.2, filed 3 Sep. 2013, and all the benefits accruing therefrom under 35 U.S.C. § 119, the contents of which in its entirety are herein incorporated by reference.

BACKGROUND

The present invention relates to computing systems, and more specifically, to accessing a set of data tables in a source database.

Database applications, for example, in application consolidation projects, master data management (MDM) projects or enterprise data management (EDM) projects have thousands of tables from which data must be extracted. However for such applications the data model may not be documented or may not be available to the customer. Also, for source system analysis, the time window in any data integration project is limited while at the same time terabytes of data need to be processed.

SUMMARY

According to one embodiment of the present invention, a method for accessing a set of data tables in a source database includes providing a set of table categories for tables in the source database and providing a set of metrics, each metric including a respective characteristic metric for each table category. The method includes, for each table of the set of the data tables evaluating the set of metrics, analyzing the evaluated set of metrics, and categorizing the table into one of the set of table categories using the result of the analysis. The method includes outputting information indicative of the table category of each table of the set of tables. The method further includes, in response to the outputting the information indicative of the table category of each table, receiving a request to select data tables of the set of data tables according to a part of the table categories for data processing. The method further includes selecting a subset of data tables of the set of data tables using the table categories for performing the data processing on the subset of data tables.

According to an embodiment, a computer program product includes a tangible computer readable medium storing computer executable instructions to perform a method when executed by a computer. The method includes providing a set of table categories for tables in the source database and providing a set of metrics, each metric including a respective characteristic metric for each table category. The method includes, for each table of the set of the data tables evaluating the set of metrics, analyzing the evaluated set of metrics, and categorizing the table into one of the set of table categories using the result of the analysis. The method includes outputting information indicative of the table category of each table of the set of tables. The method further includes, in response to the outputting the information indicative of the table category of each table, receiving a request to select data tables of the set of data tables according to a part of the table categories for data processing. The method further includes selecting a subset of data tables of the set of data tables using the table categories for performing the data processing on the subset of data tables.

According to an embodiment, a computer system for accessing a set of data tables in a source database includes a computer having at least one processor configured to perform a method for accessing the set of tables. The method includes providing a set of table categories for tables in the source database and providing a set of metrics, each metric including a respective characteristic metric for each table category. The method includes, for each table of the set of the data tables evaluating the set of metrics, analyzing the evaluated set of metrics, and categorizing the table into one of the set of table categories using the result of the analysis. The method includes outputting information indicative of the table category of each table of the set of tables. The method further includes, in response to the outputting the information indicative of the table category of each table, receiving a request to select data tables of the set of data tables according to a part of the table categories for data processing. The method further includes selecting a subset of data tables of the set of data tables using the table categories for performing the data processing on the subset of data tables.

Additional features and advantages are realized through the techniques of the present invention. Other embodiments are described in detail herein.

BRIEF DESCRIPTION OF THE SEVERAL VIEWS OF THE DRAWINGS

One or more embodiments of the invention are particularly pointed out and distinctly claimed in the claims at the conclusion of the specification. The forgoing and other features, and advantages are apparent from the following detailed description taken in conjunction with the accompanying drawings in which:

DETAILED DESCRIPTION

Figure 1:
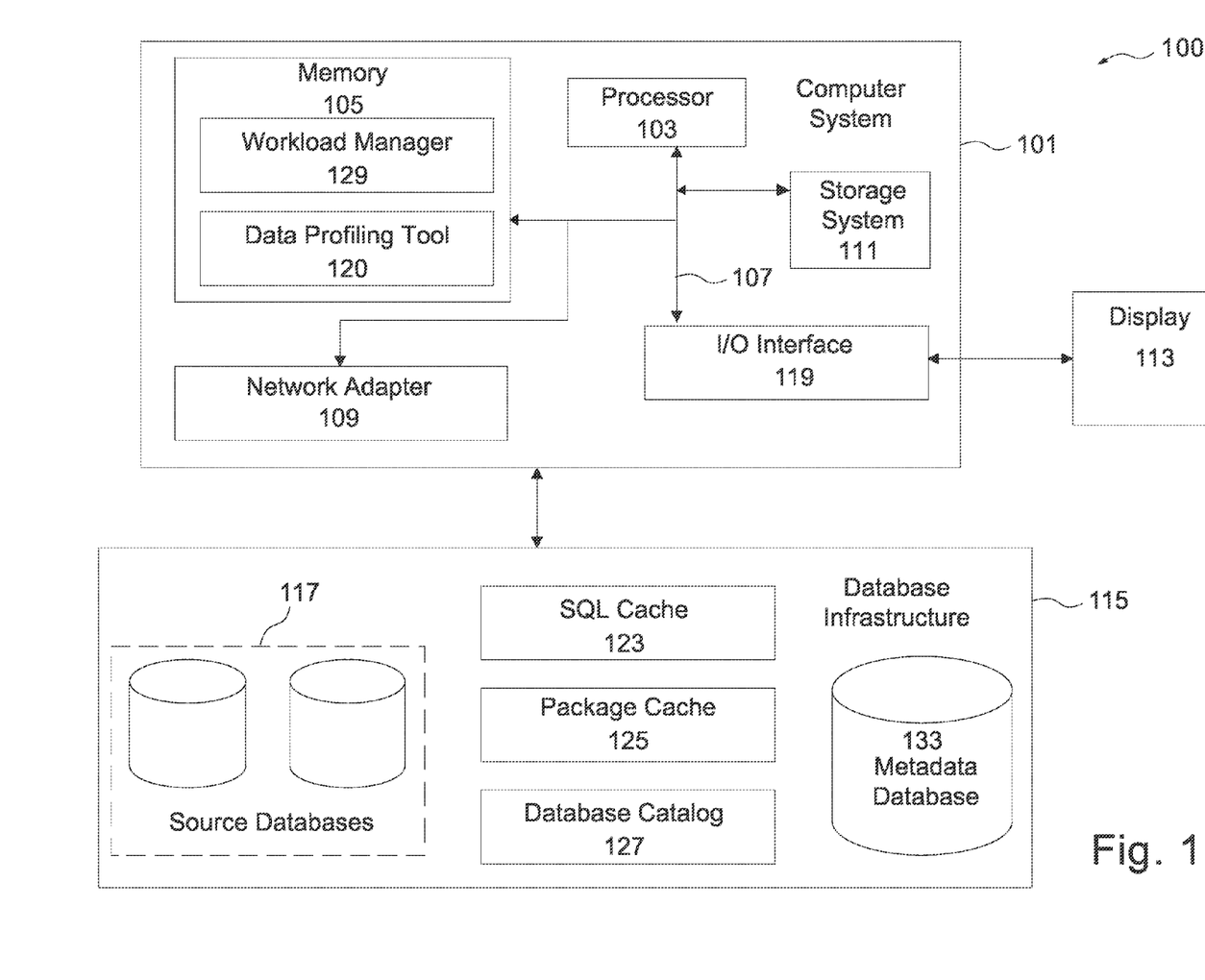
FIG. 1 illustrates a system architecture operable to execute a method for accessing data tables in a source database.

With reference now to FIG. 1, a system architecture 100 for a data profiling process on a relevant subset of data tables is shown. For example, the system architecture 100 may be part of a zEnterprise system of IBM® comprising an IBM DB2 database system.

The system architecture 100 provides a computer system 101. The components of computer system 101 may include, but are not limited to, one or more processors or processing units 103, a storage system 111, a memory system 105, and a bus 107 that couples various system components including memory system 105 to processor 103. Memory system 105 may include computer system readable media in the form of volatile memory, such as random access memory (RAM) and/or cache memory.

Computer system 101 typically includes a variety of computer system readable media. Such media may be any available media that is accessible by computer system 101, and it includes both volatile and non-volatile media, removable and non-removable media.

Computer system 101 may also communicate with one or more external devices such as a keyboard, a pointing device, a display 113, etc.; one or more devices that enable a user to interact with computer system 101; and/or any devices (e.g., network card, modem, etc.) that enable the computer system 101 to communicate with one or more other computing devices. Such communication can occur via I/O interface(s) 119. Still yet, computer system 101 can communicate with one or more networks such as a local area network (LAN), a general wide area network (WAN), and/or a public network (e.g., the Internet) via network adapter 109. As depicted, network adapter 109 communicates with the other components of computer system 101 via bus 107.

The computer system 101 may act as a database management system connected to a database infrastructure 115. The database infrastructure 115 includes source databases 117. The database infrastructure 115 may include an SQL cache 123 as well as a package cache 125. The content of these caches provides insight on which database objects of the source databases 117 are frequently used and have been recently used. This helps to score the relevancy of the tables stored in the source databases 117.

The database infrastructure 115 further includes a database catalog 127 that stores information about all existing tables and columns in the source databases 117. For each table, (unique) index structures are known. The database catalog 127 provides for each column of the tables in the database sources 117, a data type, field length, defaults, auto-generated identity, constraints, null and not nullable, PK and FK information, etc. The database catalog 127 further includes the storage category (as catalog info) of the rows of the tables stored in the database sources 117. This information may be used for example to exclude from analysis rows having archive storage categories e.g. in case the system architecture 100 includes an IBM DB2 system, this may be done by generating WHERE-clause ranges for SELECT statements. The database catalog 127 further includes partition-group (as catalog info) of the tables stored in the source databases 117. All the tables in partition groups have a logical relation (often in DW environments) supporting join-conditions. Therefore these tables are "hot candidates" for relationship detection in a data profiler tool. This information is advantageous because relationship detection among tables is the most resource and time-consuming operation of a data profiler tool and can usually only be applied to a small subset of tables. Having good candidates here substantially improves the profiling results for this type of profiling.

The database infrastructure 115 may include a metadata DB (i.e. the glossary database) 133 containing user-defined information of at least part of currently stored data tables of the source databases 117. The user-defined information may be collected from previous data processing. The metadata DB 133 is described in more details below.

Memory system 105 is configured to store a plurality of applications that are executable on the processor 103. For example, the memory system 105 may include an operating system as well as application programs.

The application programs include a data profiling tool 120 for data processing of data tables stored in the source databases 117. The application programs further include a workload management (WLM) component 129 for controlling access to the source databases 117. The WLM component 129 may produce WLM data indicative of different types of work, such as a batch or dialog that are handled by processes accessing the source databases 117. The batch work processes may access the source databases 117 using an Insert operation on the source database 117. The dialog work processes are user-input driven processes characterized with small numbers of Insert, Update and Delete operations with some read operations etc.

By the above structure, system 100 may provide multiple sources of information on data tables stored in the database sources 117.

In addition, statistics on the tables of the source databases 117 may be stored in the system 100. The statistics include, for example, for each table and each index number of rows in a table and number of nodes in an index.

Additional statistical information may be provided (e.g. if RUNSTATS command is enabled in an IBM DB2 system) like: the number of distinct values in the first column of the index, the number of distinct values in the first two, three, and four columns of the index and the number of distinct values in all columns of the index.

In addition, two kinds of data distribution statistics, frequent-value statistics and quantile statistics may also be provided by the system 100.

Frequent-value statistics provide information about a column and the data value with the highest number of duplicates, the value with the second highest number of duplicates, and so on, to the level that is specified, for example, by the value of a num_freqvalues database configuration parameter. This parameter allows one to specify the number of "most frequent values" that may be collected when the WITH DISTRIBUTION option is specified on the RUNSTATS command in an IBM DB2 system.

Quantile statistics provide information about how data values are distributed in relation to each other. Called K-quantiles, these statistics represent the value V at or below which at least K values lie. A K-quantile may be computed by sorting the values in ascending order. The K-quantile value is the value in the Kth position from the low end of the range. These statistics may be extracted by the data processes avoiding the need to create them with the data profiling tool 120 and thus saving processing time.

Further, in case the system 100 includes an IBM DB2 system, the flag Last_used_flag may be implemented on page level in the system 100 which makes it simple to identify at least on page level when the rows have been accessed the last time. The timestamp of this flag may be used as last_used indicator for all rows on a page.

The computer system 101 and database infrastructure 115 may be implemented in separate machines, or may be implemented as separate processes in a single machine.

In an alternative example, the system 100 may provide only part of the sources of information as described with reference to FIG. 1.

Figure 2:
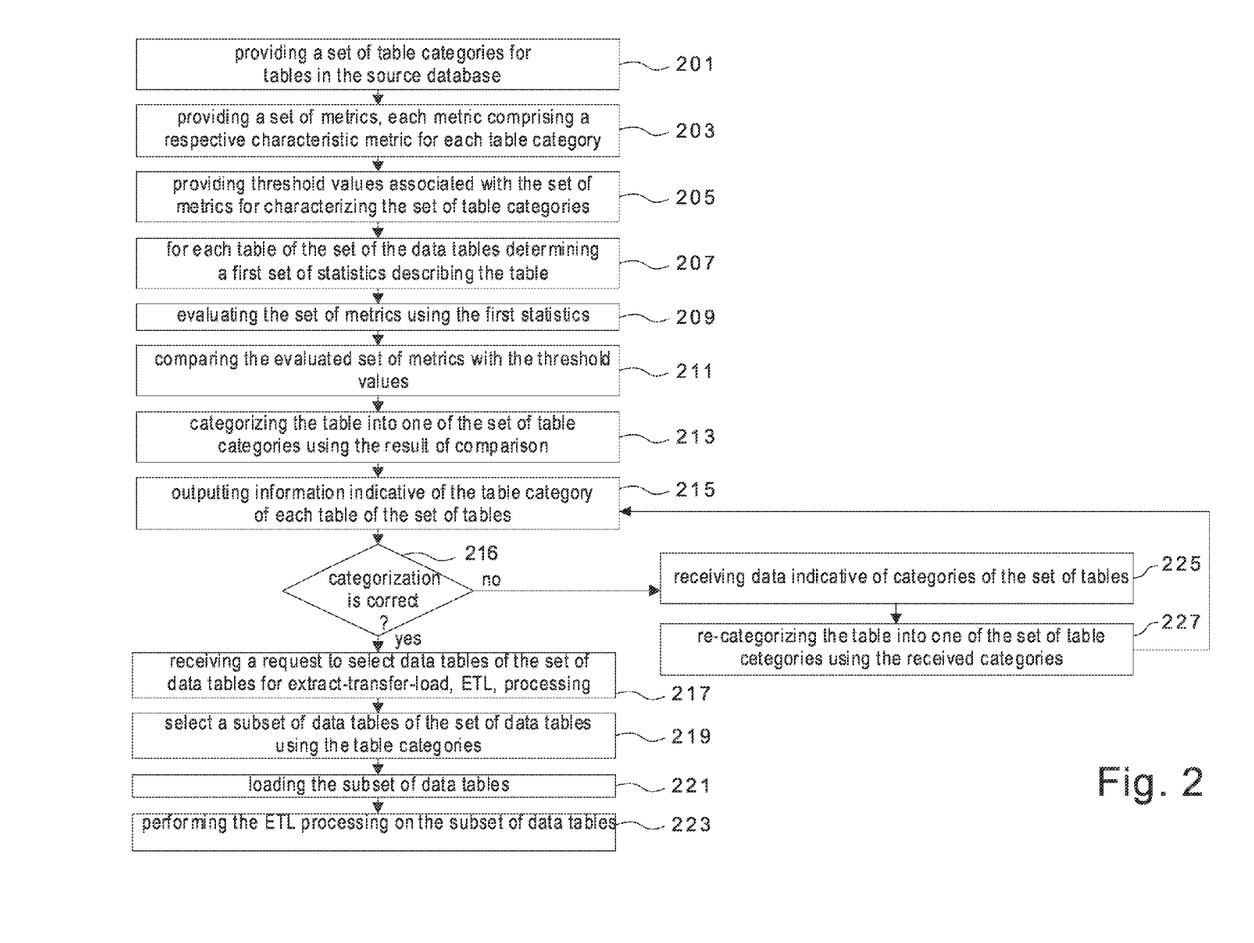
FIG. 2 illustrates a flow chart of a method for accessing data tables in a source database.

FIG. 2 is a flowchart of a method for accessing a set of data tables in a source database such as the source database 117. A set of table categories (an example of the table categories is described in details with reference to FIG. 3) for tables in the source database 117 is provided in block 201. In block 203, a set of metrics, each metric including a respective characteristic metric for each table category is provided. In block 205, threshold values associated with the set of metrics for characterizing the set of table categories are provided.

Figure 3:
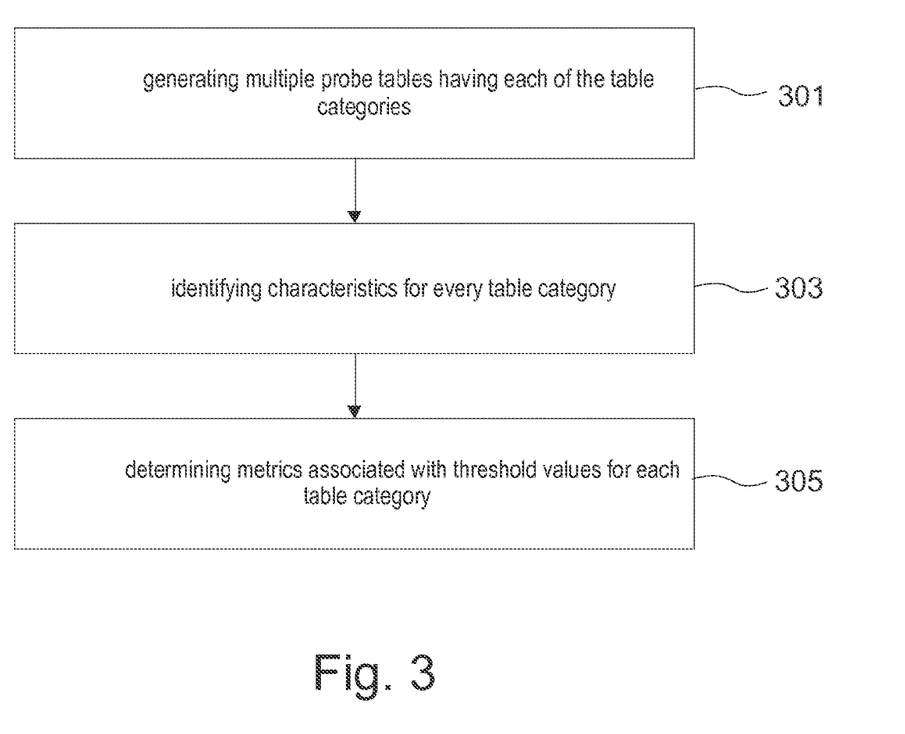
FIG. 3 illustrates a flowchart of a method for determining metrics.

The set of metrics and threshold values may be derived using the method described in FIG. 3.

For each table of the set of the data tables, in block 207, a first set of statistics describing the table is determined. The first set of statistics includes at least one of number of rows in the table; number of columns in the table; number of rows read; number of rows inserted; number of rows updated;

number of rows deleted; median of the number of columns across the set of tables; average number of columns across the set of tables; partition number; table type. The table type may include a user table, dropped table, temporary table, catalog table and reorganized table. The first set of statistics may be extracted from one of the data sources defined with reference to FIG. 1 (e.g. WLM data generated by the WLM component 129, SQL cache (123) data and package cache (125) data etc.).

In case the first set of statistics are not stored or not available, they may be determined by either calculating a first part of the first set of statistics using the set of data tables; and requesting monitoring data of the source database; and generating a second part of the first statistics using the requested monitoring data.

In block 209, the first statistics are used to evaluate the set of metrics. In block 211, the evaluated set of metrics is compared with the threshold values. For example, at least one metric may be used to define a Key Performance Indicator (KPI) that is calculated for evaluating such at least one metric. The result of the comparisons is used to categorize the table into one of the set of table categories in block 213.

In block 215, information indicative of the table category of each table of the set of tables is outputted. In block 216, it is determined whether a categorization of the tables is correct. If so, the process proceeds to block 217. If not, then the process proceeds to block 225. In block 217, in response to the output of the information indicative of the table category, and based on determining that the categorization is correct, a request is received to select data tables of the set of data tables for data processing in accordance with a part of the table categories. In block 219, a subset of data tables of the set of data tables using the table categories is selected. Depending on the data processing, the subset of data tables may be of a given data table category. In block 221, the subset of data tables is loaded into a staging area for example. In an alternative example, the subset of data tables may be processed or analyzed where they are stored i.e. without loading them into the staging area. In block 223, the data processing is performed on the subset of data tables.

In block 225, in response to the output receiving data indicating categories of the set of tables, and based on determining in block 216 that the categorization is not correct, the table is re-categorized into one of the set of table categories using the received categories in block 227. The process then proceeds back to block 215 to again output the information indicative of the table category of each table of the set of tables.

In addition, the data processing may be performed only on part of the columns and rows of the selected subset of tables. For that, in each table of the set of the tables columns and rows may be identified using characteristics of the columns and rows. For example, empty columns may not be processed by the data processing as they contain no data. In this case the empty columns may be excluded from the analysis. The characteristics of the columns include for example key columns; default values columns; range partition keys; empty columns; frequency of occurrence of the most frequent value=number of rows in table; columns with informational constraints; string columns.

The characteristics of the rows include predefined time ranges of data of the set of data tables to be processed. The data processing may only run on the data rows within that time ranges.

The operations of the method of FIG. 2 may be performed by a profiling preselector of the data profiling tool 120.

Figure 4:
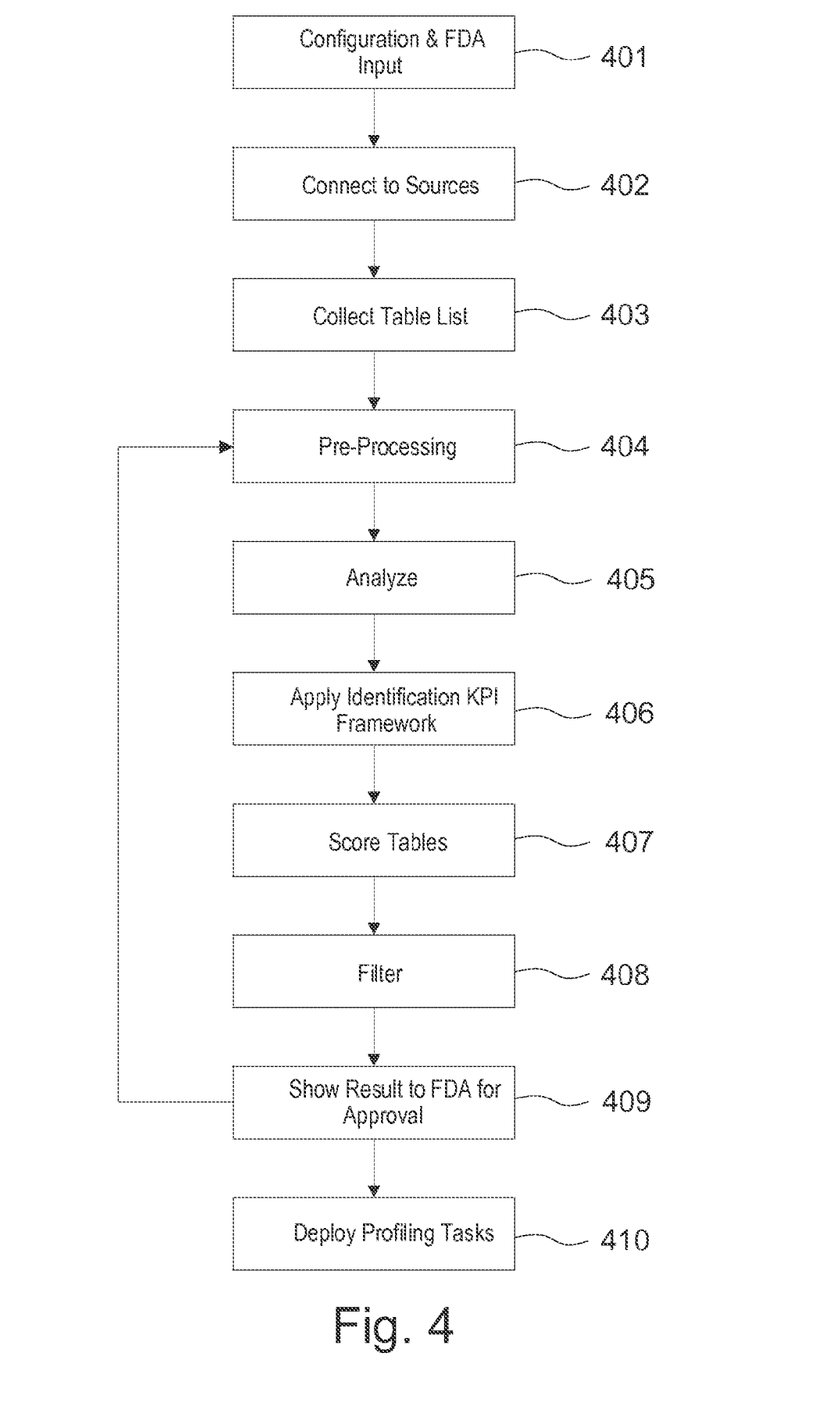
FIG. 4 illustrates a flowchart of another method for accessing data tables in a source database.

In the following, with reference to FIG. 3 and FIG. 4, the numbers and showings are for purposes of illustrating the exemplary methods only and not for purposes of limiting the claimed subject matter. By way of example and not limitation, the result values shown below may be obtained using, for example, an IBM MDM system. The IBM MDM system may be running on an IBM DB2 system.

FIG. 3 shows a method for determining metrics to characterize the tables such as tables stored in the source databases 117 for data processing. The tables may be classified into different table categories.

A detailed description of the table categories may be first given as follows. Each table category may be associated with a different priority depending on the performed data analysis or processing. The following table shows an example for a data profiling:

| Category | Priority for data profiling |
|---|---|
| Master Data Tables | Highest |
| Reference Data Tables | Medium |
| Transaction Data Tables | Low to Medium |
| Metadata Tables | Zero |
| History/Protocol/Audit Data Tables | Zero |
| Queue Data Tables | Zero |

The table categories differ by their relevancy for a given data analysis or processing. For example, master data tables include data about customers, suppliers, partners, products, materials, accounts and other key entities that participate within transactions. These data tables are most relevant tables for data profiling since data quality in these data tables' assets matters most.

Transactional data tables contain data that is produced by transactions within applications. Usually these are the "facts" not cleansed once created—therefore their priority for data profiling is usually low and in rare cases medium at best.

Reference data tables refer to data that is used to categorize other data within enterprise applications and databases. Reference data includes the lookup table and code table data that is found in enterprise applications, such as country codes, currency codes, and industry codes. Usually these are the tables supporting master data and therefore need high level of data quality. Therefore their priority for data profiling may be medium.

Metadata tables include data which describes the structure of an entity. Since these tables represent the system catalog of the database which contains the metadata regarding all other database objects the values in these tables are of highest quality (otherwise the database would not work consistently) and since they contain no business data they are completely irrelevant for data profiling. Providing the database vendor specific schema name(s) of the database catalog tables is one-time setup for the profiling preselector of the data profiling tool 120 which then ignores all tables in these schemas.

History or audit data tables include tables that are used by database managers or by an MDM system that may track all changes made on customer records for auditing purposes, to store historical versions of rows from the associated system-period temporal table. These tables contain compliance or audit relevant data which cannot be changed. Therefore they are irrelevant for data profiling because even if a data quality issue would be found, the records in these tables are not to be modified. Therefore their priority for data profiling is zero.

Queue data are usually used as buffer where a process reads record by record and purges the entry once processed. Their relevance for data profiling is zero.

To determine metrics that identify the table categories, an empirical analysis may be performed. This may be done for example by defining for each table category a set of KPIs associated with the metrics which can be used in a framework where in any instance all or a subset of the KPIs identifying a table category can be applied based on available information in the source database. The empirical analysis may be performed in a system similar to the system used for performing a data processing as described with reference to FIG. 2. Such system may be for example the system of FIG. 1, a MDM system running on an IBM DB2 system and/or an SAP system.

In block 301, multiple probe tables having each of the table categories may be generated. For each table category, characteristics are determined. The generation of the probe tables may be done, for example, in an IBM MDM system. In block 303, the following characteristics have been identified for every table category after analyzing the generated tables.

Master Data.
    Average column count for master data tables for MDM is 11 columns.
    All tables with 11 or more columns are master data tables.
    Maximum column count for master data tables for MDM system is 46 columns.
    the largest master data tables (e.g. CONTRACT, ADDRESS, MISCVALUE, BILLINGSUMMARY, CONTACT, PERSONNAME, CLAIM, LOCATIONGROUP, SUSPECT, CONTRACTCOMPONENT, CONTRACTROLE, CONTSUMMARY, ENTITLECONSTRAINT, TRANSACTIONLOG, INTERACTION, IDENTIFIER, PRODUCT, ENTITYCONTENTREFERENCE, PERSON and ORGNAME) have between 16 and 41 columns—which is approximately 3 to 7 times the number of columns compared to the average of 90% of all reference data tables.
    Very high read access rate.
    Low insert and update operations rates per time unit.
    Low volume (=low record number) compared to transactional data.
    Usually no delete operations (in rare cases delete operations are logical).
    Many PK and FK relationships to reference data tables.

Transactional Data
    Mixed read and write workload.
    Very high update operation rate per time unit compared to master data tables.
    Highest volume throughput per time unit compared to all other table types.
    Delete operations—which are rare—are usually logical.
    Usually high number of columns compared to reference data tables.
    Many PK and FK relationships to master data tables.

Reference Data
    Average column count for reference data tables is 6 columns.
    Maximum column count for reference data tables is 11 columns.
    minimum column count for reference data tables is 3 columns
    16 from 183 reference tables have less than 5 or more than 7 columns which means 167 columns have 5 to 7 columns (94 have 6, 58 have 7 and 15 have 5 columns). 90% of all reference tables have +−1 column of average column range
    the average number of rows in a reference table is 90 rows
    The maximum number of rows in a reference table is 8398 rows.
    The minimum number of rows in a reference table is 0 rows.
    169 out of 183 reference tables have a PK declared.
    142 PKs have 2 columns each.
    27 PKs have 1 column each.
    Ratio of PK to non-key columns for reference tables is approximately 1:2 (i.e. for each key column, there is on average 2 non-key columns).
    Ratio of columns with high uniqueness ratio compared to columns with low uniqueness ratios (e.g. mostly containing null values or same values) is particularly high compared to master data tables.
    42 of 183 (approx. 23%) of the references tables have explicitly declared FK constraints to master data tables.

Metadata
    Usually separated from the tables containing business data (by holding them in a special database schema e.g. "SYSCAT", flagging these tables as read only for database users, following a certain naming convention, etc.)

History, Protocol and Audit Data
    Workload is an insert operation only.
    Often triggers which write in these tables have timestamps (e.g. in an SAP system case the timestamp is found in a varchar (14)).
    Usually equal or larger than the transactional and master data tables for which they record the history.
    Schema identical to their transactional and master data table for which they perform history, protocol and audit function with the addition of some audit and compliance related fields (e.g. timestamps).
    Higher number of rows compared to all other table types.
    Naming convention (e.g. "h_XYZ" for MDM systems).
    No triggers on history tables e.g. in MDM systems.
    Database catalog allows analysis which tables have triggers defined and to which tables the triggers write results tables to which trigger write results are history tables.
    With 378 history tables 1115 triggers are found (373 Insert operations, 373 Update operations, 369 Delete operations).
    History table schema is an original table schema+additional columns.

Queue Tables
    The tables used as queue tables have equal number of inserts and delete operations.
    Usually the tables have no update operations.

In block 305, metrics associated with threshold values for each table category are determined using the above characteristics. Following are example metrics derived from the above determined characteristics of block 303.

Queue Tables
    |ROWS_INSERTED−ROWS_READ|<t1 AND |ROWS_DELETED−ROWS_READ|<t1 AND ROWS_UPDATED=0, where t1 is a threshold value close to 0 e.g. 1. ROWS_READ is the number of rows read; ROWS_INSERTED is the number of rows inserted; ROWS_UPDATED is the number of rows updated and ROWS_DELETED is the number of rows deleted.

History Data Tables
    For each table T_i of a set of tables TL in the source database: If ROWS_INSERTED>0 AND ROWS_UPDATED=0 AND ROWS_DELETED=0 AND num_cols>med_cols, the table T_i is a history data table candidate.
    If the previous check is fulfilled, additional tests may be performed by, for example, comparing schema T_i with each table T in TL as follows num_cols (T_i)>num_cols (T) AND num_rows (T_i)>=num_rows (T). If the test is successful, check if each column defined in T exists in T_i, if it is the case the table T is already included in T_i and may thus be excluded from processing stage.
Reference Data Tables
    (ROWS_INSERTED+ROWS_UPDATED+ROWS_DELETED)/ROWS_READ<t2. This metric basically reflects that there is tremendously large number of read operations on reference data tables but a negligible amount of modifying operations. t2 is a threshold value close to zero.
    Check if T_i has a primary key.
    num_cols (T_i)<=med_cols (T_i).
    (num_rows (T_i)/max_num_rows)<t3 where max_num_rows is the number of rows in the largest table. t3 is a threshold value close to zero. This check reflects that reference data tables with a few dozen to a few hundred entries are small compared to the large fact tables which may have for example $10^9$ or more rows.
    Number of PK and FK>=1.
    The ratio of non-key columns to key columns is between 1:1 and 2:1 on average.
    The ratio of columns with a high ratio of unique values compared to total number of columns in the table is very high.
Master Data Tables
    If (ROWS_INSERTED+ROWS_UPDATED+ROWS_DELETED)/ROWS_READ~0 AND (|ROWS_INSERTED-AVG_ROWS_INSERTED|<t4) AND |ROWS_UPDATED-AVG_ROWS_UPDATED|<t5 AND|ROWS_DELETED-AVG_ROWS_DELETED|<t6, where AVG_ROWS_INSERTED, AVG_ROWS_UPDATED and AVG_ROWS_DELETED are the average values inserted, updated and deleted rows for all tables in the set of tables TL.
    The first condition reflects the fact that master data tables have substantially more read than modifying operations whereas transactional tables have a more hybrid workload pattern.
    The threshold values t4, t5 and t6 that are close to zero indicate that the volume of operations in absolute as well as per time unit on transactional tables is substantially larger due to the substantially larger table sizes compared to the master data tables.
    Check for each table in TL if it has at least 1 PK and FK relationship to a table passing the KPIs useful to identify reference data tables. This check basically reflects that master data tables usually have relationships to one or more reference data tables.
Transactional Data Tables
    Check for each table in the TL list which based on the previous KPI of master data tables is more likely a transactional table that it has at least 1 PKFK relationship to a table for which the previous check suggests that it is master data table. If this KPI is not fulfilled mark the table as one for review by a Functional Data Analyst (FDA) of the system 100. This check basically reflects the idea that transactional data tables have PK and FK relationships with master data tables.

In the following further details of a data processing method as described above are presented with reference to FIG. 4.

In block 401, the FDA provides the following input information in a fully-automated implementation:
    Credentials to connect to the source databases 117 as well as to the Metadata DB 133 if it exists or to the business application's data dictionary if available.
    Time range of relevant data per source database.
    Optimization level.
    Database catalog schemas: This is optional since it may not be needed in some implementations because the metadata tables which are the database catalog tables might be automatically identifiable. The data profiling tool may have a library of the catalog schema names per database vendors so that the FDA might only need to select the appropriate library for the database vendor per source database.
    In a semi-automated approach the FDA might also provide a couple tables per table category as training examples. Optionally, if available, for the source database in question there might be a library available for the FDA to select from providing additional information on naming conventions for table categories, etc. which may be useful.

In block 402, the profiling preselector of the data profiling tool 120 establishes a connection per source database of the source databases 117.

In block 403, the profiling preselector of the data profiling tool 120 collects the list of all tables called TL in the source database 117. If the database catalog schema was provided by the FDA, the data profiling tool 120 may eliminate all metadata tables at this point already from TL using the database catalog schema to identify them.

In block 404, the profiling preselector of the data profiling tool 120 identifies based on the type of the data source which key performance indicators KPIs from a KPI framework can be used for the identification of the table categories. For example, each KPI may implement a single or combinations of metrics as defined above for each table category.
    For example, in case the monitoring information regarding rows read, rows updated, etc. might be not available (or only available if explicitly requested) or on different levels of granularity, this block 404 further includes:
    For each table T in TL, the profiling preselector of the data profiling tool 120 determines the number of rows (num_rows) in the table.
    For each table T, the profiling preselector of the data profiling tool 120 determines the number of columns (num_cols). For each table T, the data profiling tool 120 checks if the table is in a partition group (PG) and if so, adds the partition group information to T.
    Optionally done depending on data source type. For example, in case of an IBM DB2, the operation further includes getting monitoring information per table. If the monitoring stats are not already available, they can be requested which in DB2 case can be done for example by invoking MON_GET_TABLE for each T in TL:
        ROWS_READ
        ROWS_INSERTED
        ROWS_UPDATED
        ROWS_DELETED
        DBPARTITIONNUM: database partition number in case of partitioned databases.

TAB_TYPE: The value is one of the following: USER_TABLE, DROPPED_TABLE, TEMP_TABLE, CATALOG_TABLE and REORG_TABLE.

In block 405, additional analysis for the tables in the TL list may be done:

In this operation all tables from TL which are of type DROPPED_TABLE, TEMP_TABLE, CATALOG_TABLE (only applicable if not filtered in block 401 already) and REORG_TABLE are removed from TL.

Trigger Analysis
  getting the list of all triggers and its definition for each table T in TL
  performing for each trigger the following analysis:
  checking that there are tables referenced by the trigger other than table T—if yes, add tuples to a list TL_TR containing all tables referenced by triggers (tables on which triggers do something) and for these tables if the trigger operation is an Insert, Update or Delete operations trigger where a tuple consists of (T, T_tr, operation)
  Compute med_cols:
  Here the profiling preselector of the data profiling tool 120 computes the median (med_cols) of the column number num_cols across all tables (num_TL):
    Median med_cols(num_cols).
    avg_cols=SUM(num_cols)/num_TL would be the average number of columns across all tables. By computing the median instead of the average a more precise measure on the distribution of the column number may be provided. For example, for master data, there are usually often 5-15× more reference data tables than data tables containing master data.

In block 406, the profiling preselector of the data profiling tool 120 starts to categorize the tables in the TL list into the table categories using the various KPIs selected in block 404 as being applicable. Thus each table in the TL list is evaluated regarding multiple KPIs and for each KPI applied a result of the KPI check is added to the entry T of the table in the TL list indicating the result. A sample list of KPIs which may be applied in this operation based on the outcome in block 404, are associated respectively to the metrics defined in block 205 of FIG. 2.

In block 407, based on the KPI evaluations and the analysis done (e.g. on triggers) the profiling preselector of the data profiling tool 120 may compute for each table in the TL list a weighted score putting it into one of the identified table categories.

For example, the metrics defined in block 205 may be evaluated for a given table, and checked whether they fulfill the condition of a table category or not. The results may be combined in the weighted score.

The scoring process might include a weight to reflect information found in the metadata DB 133 if for example due to a business glossary appropriate metadata was detected and available.

For final sorting of the tables for presentation in the UI to the FDA in each category (master data, transactional data, reference data, metadata, history and queue tables) additional scoring techniques may be applied to determine a rank:
  Compute percentage of pages with a last_used_flag timestamp>=oldest time of interest for data integration. This score gives some insight how much data in a table was recently used.
  Analyze SQL cache 123 and package cache 125: Count each appearance of columns and tables found and based on the counter result increase or decrease ranking of columns and tables. This approach basically reflects the idea that what is not used is likely not relevant.
  Analyze WLM information generated by the WLM component 129: Any table and column appearing with the dialog workload type has a higher probability of being relevant for data profiling because the data is entered by humans and thus might have data quality problems (typos, lack of standards, etc.)
  Determine the final rank based on weighted scoring of all parameters.

For primary key detection and cross-domain analysis profiling the FDA gets groups of candidates in a separate view based on the database partition groups' information attached to each table.

In block 408, a large number of detailed tasks per column in each table in the table list are done. The outcome of this operation has the following characteristics:
  Each column in each table is prioritized regarding profiling tasks as well as all metadata.
  For each column if informational constraints are found, data profiling rules have been created for validation.
  Based on the optimization level setting, the following will be computed:
    For each column the information if the value set is unique will be available (by analysis of PK, unique index and if neither of them is there, but the distribution statistics show each value exists once)—this information is relevant for performance optimization
    For each column the information if distribution statistics exist will be available
    STRING columns will be marked as candidates for inferred type analysis
  In this operation based on the time range provided by the FDA in block 401 the relevant SQL where-clauses for the ETL extraction will be computed exploiting also storage group information.

In block 409, the profiling preselector of the data profiling tool 120 presents all tables based on their ranking (e.g. master data before transactional data, etc.). For primary key detection and cross-domain analysis profiling the FDA gets groups of candidates in a separate view based on the database partition groups' information attached to each table. Then the FDA can review suggested profiling tasks and optimizations (if necessary uncheck so that more is profiled) on the presented tables. Once the FDA approves the profiling scope, for all tables and columns approved the metadata will be automatically pushed to the Metadata DB 133.

Also it has to be noted, that the FDA has the option to re-run the algorithm taking into consideration the $2^{nd}$ execution approved outcomes from the first run. This is another mean to train the algorithm so that tables not approved at the end of the first iteration might be automatically and correctly identified on the $2^{nd}$ iteration.

Also to be noted that the FDA has the ability at this time to create a library for an analyzed source system if it is deemed worthwhile for re-use. For example, many customers have dozens to several hundreds of SAP systems. Once the first system is profiled, a library with the table classification created is useful to even quicker and more accurately classify the tables for profiling tasks in additional SAP systems. This is of particular value if multiple systems are consolidated into a single new system (a typical case in SAP consolidation projects).

In block 410, based on the approved profiling tasks, ETL extracts may be built for deploying the profiling tasks.

The method blocks 401-410 may run in parallel for multiple database sources and within each database source using database connection pooling techniques several of the blocks can be parallelized within the database source.

In the following, a detailed description of the metadata DB 133 is provided. The metadata DB 133 contains in addition to technical metadata, business metadata such as a business glossary. If business metadata is available, then the data profiling tool can use it to extract the following information:

For all tables (except the metadata ones which are filtered out right away) found in the sources, check if they are linked to business terms in process domains for which the data integration project should deliver data. If that's the case, the table might be a candidate to look at (depending into which of the 6 categories it is classified). After all, the table classification is already performed in a business glossary which is under Data Governance control indicating that the table might be relevant.

In case the table is found in the business glossary, related assets might be linked to the same term. Therefore table names of related tables which might be a candidate for a relationship discovery profiling exercise to validate if such columns across tables exist and data is redundant across tables should be done on them. This information is also consumed by the data profiling tool and used in the decision making process.

In case the table makes into the result list and is found in the business glossary, enrich the information for the FDAs with the business metadata from the business glossary. This improves the understanding of the table for the FDAs making their final approval process of the profiling more accurate in terms what is profiled as well as which profiling techniques need to be applied to identify data quality issues which are to be resolved due to the business function supported by the tables and columns.

Embodiments relate to methods, systems, devices, computer program products for improving the accessing of data in data tables in a source database by accessing a set of tables in the source database.

In one embodiment, a method for accessing a set of data tables in a source database includes providing a set of table categories for tables in the source database and providing a set of metrics, each metric including a respective characteristic metric for each table category. The method includes, for each table of the set of the data tables, evaluating the set of metrics, analyzing the evaluated set of metrics, and categorizing the table into one of the set of table categories using the result of the analysis. The method includes outputting information indicative of the table category of each table of the set of tables and in response to the outputting receiving a request to select data tables of the set of data tables according to a part of the table categories for data processing. The method further includes selecting a subset of data tables of the set of data tables using the table categories for performing the data processing on the subset of data tables.

In one embodiment, the method is performed by a computer, including a processor, memory, and supporting logic specially designed and configured to communicate with the source database and to perform the above-described analyses, categorizations, and generation and storage of metrics, transmission and receiving of information. In one embodiment, the specially-designed computer is configured to perform the described method by programming physical connections in one or more of the processor, supporting logic, or other circuitry of the computer, such as by forming physical wiring to allow communications between components and breaking connections, such as with a programmable gate array (PGA) to prevent particular connections among components, including chips, passive components, transistors, etc.

The term "source database" as used herein refers to a database in which a user stores data or operational information, e.g., in unstructured text and/or structured data that are input into the system. The source database may be used to create a target database.

According to one embodiment the method further includes providing threshold values associated with the set of metrics for characterizing the set of table categories, and the analyzing includes comparing the evaluated set of metrics with the threshold values.

According to one embodiment, the analysis of the evaluated set of metrics includes a statistical analysis of the evaluated set of metrics. For example, a data mining classification or clustering algorithm may be employed for the statistical analysis.

The data processing may be for example an ETL processing and/or data mining.

An 'ETL process' as used herein stands for extraction, transformation and loading. The process involves the extraction of data from the source database, the transformation of that data into a structure that is appropriate for analysis and loading the data into target tables.

One technical effect of one or more of the above embodiments is that they may speed up the data processing by eliminating the time required to analyze irrelevant data tables. Thus, the above-described embodiments may be seamlessly integrated in data integration systems having a limited time window for processing terabytes of data.

Another technical effect of one or more of the above embodiments may be that the amount of data profiling work (e.g. for preparing an ETL project) or data processing work may be reduced to the relevant minimum saving development time, test time and reducing hardware cost.

Another technical effect of one or more of the above embodiments may be that the less data is downloaded (e.g. by an ETL process) from the source databases into a staging environment, the less hardware (e.g. CPUs, disks, etc.) may be required.

According to one embodiment, providing a metric for a given table category includes generating multiple probe tables having the given table category, determining the metric for said table category using characteristics of the multiple tables, and defining one or more threshold values associated with the metric for characterizing said table category.

In another example, one or more statistical methods may be defined for analyzing the evaluated metric values.

According to one embodiment, the metric is determined using at least one of the following characteristics of a table: read access rate, insert, delete and update rates, number of records, number of columns, number of primary Key (PK) and Foreign Key (FK) relationships, volume throughput for an ETL process, timestamp value, and assigned trigger type.

A technical effect of one or more of the above embodiments is that they may provide an accurate and reliable method for classifying the data tables based on multiple table characteristics.

According to one embodiment, the metric is evaluated using a predetermined first set of statistics, and determining the first set of statistics includes generating the first set of statistics from at least one of the following: data stored in a database catalog of the source database, data stored in a database cache associated with the source database, workload data of a workload management component of the source database, monitoring data of the source database, historic data of previous data processing, and a glossary database having user-defined information on data stored in the source database.

A technical effect of one or more of the above embodiments is that they may allow a more precise table categorization (or classification) method using multiple sources of information on the data in the source database.

According to one embodiment, the metric is evaluated using a predetermined first set of statistics. The first set of statistics includes first and second parts. The determining of the first set of statistics may include one or more of the following: calculating a first part of the first set of statistics using the set of tables, requesting monitoring data of the source database, receiving the requested monitoring data, and generating a second part of the first statistics using the requested monitoring data.

A technical effect of one or more of the above embodiments is that the table categorization may be performed on multiple systems including the ones having no sources of information about data tables stored in the source database.

According to one embodiment, the first set of statistics includes one or more of the following: number of rows in the table, number of columns in the table, number of rows read, number of rows inserted, number of rows updated, number of rows deleted, median of the number of columns across the set of tables, average number of columns across the set of tables, partition number, and table type.

According to one embodiment, the method further includes sorting the tables in the set of tables to generate a sorted list, the tables being sorted based on a second set of statistics determined for each table of the set of tables. The selecting of the subset of tables may be performed using the sorted list.

Providing a sorted list of tables for each table category may provide a further selection criterion that may further reduce the profiling or processing time by selecting for example high ranked tables only.

According to one embodiment, the second set of statistics includes one or more of the following: percentage of used data in a table of the set of data tables over time, workload data type, and an access count for the tables of the set of tables in a cache associated with the source database.

According to one embodiment, the method further includes in response to the outputting receiving data indicating categories of the set of tables; re-categorizing the table into one of the set of table categories using the received categories, and performing operations of outputting the information indicative of the table category of each table of the set of tables, in response to the outputting of the information, receiving the request to select the data tables of the set of data tables according to a part of the table categories for data processing, and selecting the subset of data tables of the set of data tables using the table categories for performing the data processing on the subset of data tables.

A technical effect of one or more of the above embodiments is that they may support users in finding tables and columns which contain data that is most relevant for their analysis.

According to one embodiment, the method further includes storing the information indicative of the table category of each table of the set of tables in association with the performed data processing, using said stored information for categorizing tables being processed by a subsequent data processing. The tables may include at least part of the set of data tables.

A technical effect of one or more of the above embodiments is that they may reduce system resources consumption while avoiding the reselection and re-categorization of previously processed data tables.

According to one embodiment, further includes identifying in each table of the set of the tables columns and rows using characteristics of the columns and rows, and the data processing is performed on the identified columns and rows of the subset of tables.

A technical effect of one or more of the above embodiments is that they may further reduce the profiling time. For example, the profiling time may be reduced by a factor of 2-4 by avoiding the analysis of key columns.

According to one embodiment, the characteristics of the columns include one or more of the following: key columns, default values columns, range partition keys, empty columns, frequency of occurrence of the most frequent value=number of rows in table, columns with informational constraints, columns having an automatically generated value, and string columns.

A column having an automatically generated value may be a column having an auto increment field (1, 2, 3, 4 . . . ) or a timestamp etc.

According to one embodiment, the characteristics of the rows include predefined time ranges of data of the set of data tables to be processed.

In another aspect a computer program product includes computer executable instructions to perform the method of any one of the preceding embodiments.

According to another embodiment, a computer system for accessing a set of data tables in a source database is configured for providing a set of table categories for tables in the source database and for providing a set of metrics, each metric including a respective characteristic metric for each table category. The system is configured to perform the following for each table of the set of the data tables: evaluating the set of metrics, analyzing the evaluated set of metrics, and categorizing the table into one of the set of table categories using the result of the analysis. The system is further configured for outputting information indicative of the table category of each table of the set of tables, and in response to the outputting of the information, receiving a request to select data tables of the set of data tables according to a part of the table categories for data processing. The system is further configured for selecting a subset of data tables of the set of data tables using the table categories for performing the data processing on the subset of data tables.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device including "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each including a processor or processors. The computer executable code may be executed by multiple processors that may be within the same computing device or which may even be distributed across multiple computing devices.

Computer executable code may include machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the embodiments in the form disclosed. Many modifications and variations will be apparent to those of ordinary skill in the art without departing from the scope and spirit of the embodiments of the invention. One or more of the preceding embodiments were chosen and described in order to explain the principles of the embodiments and the practical application, and to enable others of ordinary skill in the art to understand the embodiments with various modifications as are suited to the particular use contemplated The flow diagrams depicted herein are just one example. There may be many variations to this diagram or the operations described therein without departing from the spirit of the invention. For instance, the operations may be performed in a differing order or operations may be added, deleted or modified. All of these variations are considered a part of the claimed invention.

While one or more embodiments have been described, it will be understood that those skilled in the art, both now and in the future, may make various improvements and enhancements which fall within the scope of the claims which follow.

What is claimed is:

1. A method for accessing a set of data tables in a source database, comprising:
   providing, by a processor of a computing system, a set of table categories for tables in the source database;
   providing, by the processor, a set of metrics, each metric comprising a respective characteristic metric for each table category, wherein the providing of the set of metrics includes:
      generating, by the processor, from the set of data tables, multiple probe tables having each of the table categories,
      identifying, by the processor, characteristics for every table category after analyzing the multiple probe tables, and
      determining, by the processor, metrics associated with threshold values for each table category based on the identified characteristics of the multiple probe tables;
   for each table of the set of the data tables: evaluating, by the processor, the set of metrics, analyzing, by the processor, the evaluated set of metrics, and categorizing, by the processor, each table into one of the set of table categories using a result of the analysis;

outputting, by the processor, information indicative of each table category of each table of the set of data tables;

in response to the outputting of the information indicative of each table category of each table of the set of data tables, receiving, by the processor, a request to select data tables of the set of data tables according to a part of the set of table categories for extraction, transformation, and loading (ETL) processing;

selecting, by the processor, a subset of data tables of the set of data tables using the set of table categories for performing the ETL processing on the subset of data tables; and performing, by the processor, the ETL processing on the source database using the selected subset of the data tables in the source database as input;

wherein evaluating the set of metrics includes evaluating the set of metrics using a predetermined first set of statistics, the predetermined first set of statistics comprising a first part and a second part, wherein determining the predetermined first set of statistics comprises:

calculating the first part of the predetermined first set of statistics using the set of tables;

requesting monitoring data of the source database;

receiving the monitoring data; and generating the second part of the predetermined first set of statistics using the monitoring data.

2. The method of claim 1, wherein each metric is determined using at least one of the following characteristics of a table: read access rate, insert, delete and update rates, number of records, number of columns, number of primary Key and Foreign Key relationships, volume throughput for an extraction, transformation, and loading (ETL) process, timestamp value, and assigned trigger type.

3. The method claim 1, wherein the predetermined first set of statistics used in the evaluation of the set of metrics comprises: a number of rows in a table; a number of columns in the table; a number of rows read; a number of rows inserted; a number of rows updated; a number of rows deleted; a median of a number of columns across the set of tables; an average number of columns across the set of tables; a partition number; and a table type.

4. The method of claim 1, further comprising sorting tables in the set of data tables to generate a sorted list, the tables being sorted based on a second set of statistics determined for each table of the set of data tables, wherein the selecting of the subset of data tables is performed using the sorted list.

5. The method of claim 4, wherein the second set of statistics comprises: percentage of used data in a table of the set of data tables over time; workload data type; and an access count for the tables of the set of data tables in a cache associated with the source database.

6. The method of claim 1, further comprising:

in response to the outputting of the information, receiving data indicating categories of the set of data tables;

re-categorizing a table into one of the set of table categories using the data indicating categories of the set of data tables; and performing operations of outputting the information indicative of each table category of each table of the set of data tables, receiving the request to select the data tables, and selecting the subset of the data tables.

7. The method of claim 1, further comprising:

storing the information indicative of each table category of each table of the set of data tables in association with the ETL processing; and using said information for categorizing tables being processed by a subsequent data processing, wherein the tables comprise at least part of the set of data tables.

8. The method of claim 1, further comprising identifying in each table of the subset of the data tables columns and rows using characteristics of the columns and rows, wherein the ETL processing is performed on the identified columns and rows of the subset of data tables.

9. The method of claim 8, wherein the characteristics of the columns that are identified in each table of the subset of the data tables comprise: key columns, default values columns, range partition keys, empty columns, frequency of occurrence of a most frequent value that equals a number of rows in table, columns with informational constraints, and string columns.

10. The method of claim 8, wherein the characteristics of the rows comprise predefined time ranges of data of the subset of data tables to be processed.

11. A computer program product for accessing a set of data tables in a source database, the computer program product comprising a non-transitory computer readable storage medium having program instructions embodied therewith, wherein the computer readable storage medium is not a transitory signal per se, the program instructions executable by a processor to cause the processor to perform a method, comprising:

providing, by the processor, a set of table categories for tables in the source database;

providing, by the processor, a set of metrics, each metric comprising a respective characteristic metric for each table category, wherein the providing of the set of metrics includes:

generating, by the processor, from the set of data tables, multiple probe tables having each of the table categories, identifying, by the processor, characteristics for every table category after analyzing the multiple probe tables, and determining, by the processor, metrics associated with threshold values for each table category based on the identified characteristics of the multiple probe tables;

for each table of the set of the data tables: evaluating, by the processor, the set of metrics, analyzing, by the processor, the evaluated set of metrics, and categorizing, by the processor, each table into one of the set of table categories using a result of the analysis;

outputting, by the processor, information indicative of each table category of each table of the set of data tables;

in response to the outputting of the information indicative of each table category of each table of the set of data tables, receiving, by the processor, a request to select data tables of the set of data tables according to a part of the set of table categories for extraction, transformation, and loading (ETL) processing;

selecting, by the processor, a subset of data tables of the set of data tables using the set of table categories for performing the ETL processing on the subset of data tables; and performing, by the processor, the ETL processing on the source database using the selected subset of the data tables in the source database as input;

wherein evaluating the set of metrics includes evaluating the set of metrics using a predetermined first set of statistics, the predetermined first set of statistics comprising a first part and a second part, wherein determining the predetermined first set of statistics comprises:
  calculating the first part of the predetermined first set of statistics using the set of tables;
  requesting monitoring data of the source database;
  receiving the monitoring data; and
  generating the second part of the predetermined first set of statistics using the monitoring data.

12. The computer program product of claim 11, wherein each metric is determined using at least one of the following characteristics of a table: read access rate, insert, delete and update rates, number of records, number of columns, number of primary key and foreign key relationships, volume throughput for an ETL process, timestamp value, and assigned trigger type.

13. A computer system for accessing a set of data tables in a source database, the computer system including a computer including at least one processor configured to perform a method for accessing the set of data tables, the method comprising:
  providing, by the computer system, a set of table categories for tables in the source database;
  providing, by the computer system, a set of metrics, each metric comprising a respective characteristic metric for each table category, wherein the providing of the set of metrics includes:
    generating, by the computer system, from the set of data tables, multiple probe tables having each of the table categories,
    identifying, by the computer system, characteristics for every table category after analyzing the multiple probe tables, and
    determining, by the computer system, metrics associated with threshold values for each table category based on the identified characteristics of the multiple probe tables;
  for each table of the set of the data tables, evaluating, by the computer system, the set of metrics, analyzing, by the computer system, the evaluated set of metrics, and categorizing, by the computer system, each table into one of the set of table categories using a result of the analysis;
  outputting, by the computer system, information indicative of each table category of each table of the set of data tables;
  in response to the outputting of the information indicative of each table category of each table of the set of data tables, receiving, by the computer system, a request to select data tables of the set of data tables according to a part of the set of table categories for extraction, transformation, and loading (ETL) processing;
  selecting, by the computer system, a subset of data tables of the set of data tables using the set of table categories for performing the ETL processing on the subset of data tables; and
  performing, by the computer system, the ETL processing on the source database using the selected subset of the data tables in the source database as input;
  wherein evaluating the set of metrics includes evaluating the set of metrics using a predetermined first set of statistics, the predetermined first set of statistics comprising a first part and a second part, wherein determining the predetermined first set of statistics comprises:
  calculating the first part of the predetermined first set of statistics using the set of tables;
  requesting monitoring data of the source database;
  receiving the monitoring data; and
  generating the second part of the predetermined first set of statistics using the monitoring data.

14. The computer system of claim 13, wherein the predetermined first set of statistics used in the evaluation of the set of metrics comprises: a number of rows in a table; a number of columns in the table; a number of rows read; a number of rows inserted; a number of rows updated; a number of rows deleted; a median of a number of columns across the set of tables; an average number of columns across the set of tables; a partition number; and a table type.

* * * * *